Figure 3:
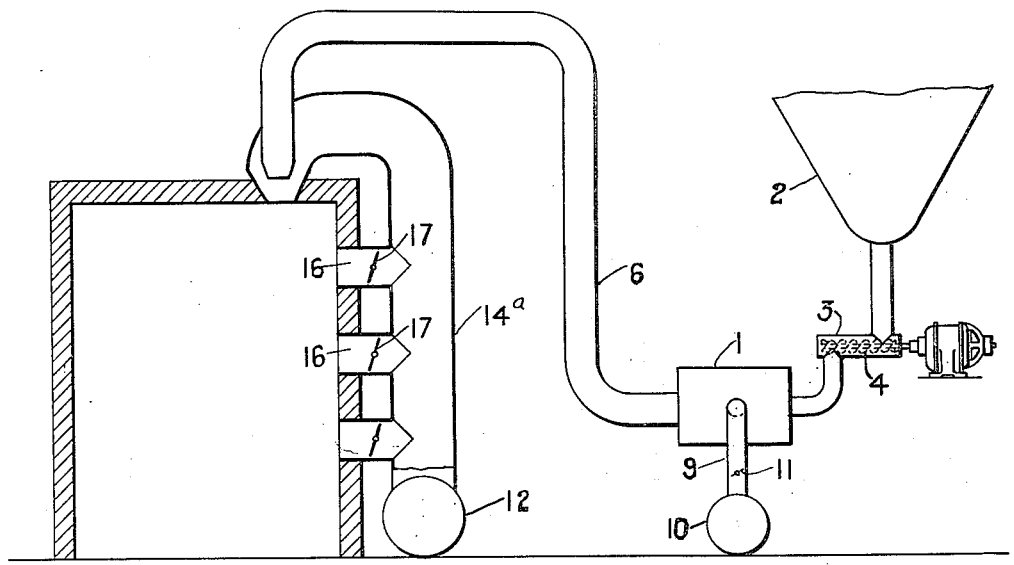

Jan. 15, 1924.                                            1,481,067
R. E. H. POMEROY
COMBUSTION OF PULVERIZED FUEL
Filed Nov. 19, 1921                5 Sheets-Sheet 1
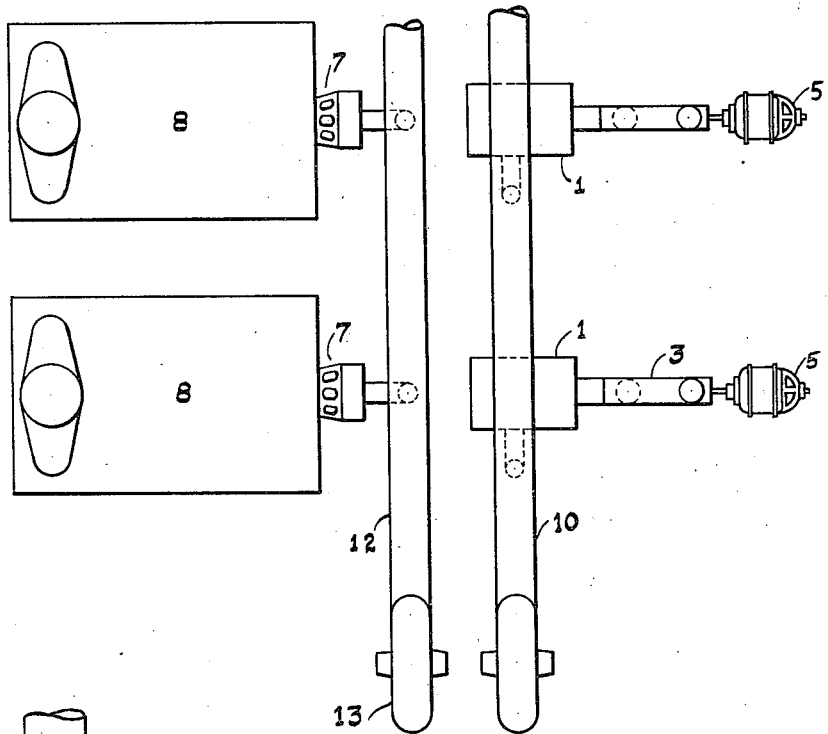
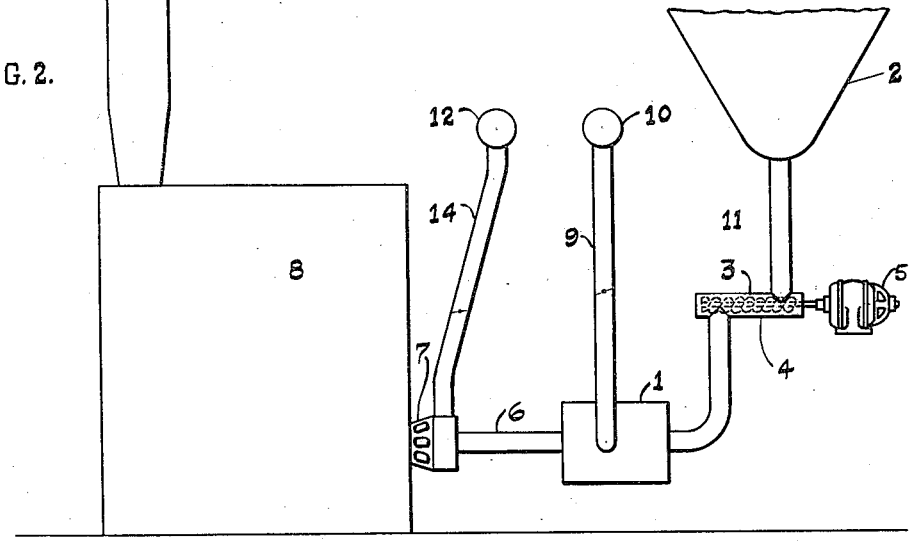
INVENTOR
Ralph E. H. Pomeroy
by Darwin S. Wolcott
ATTORNEY Jan. 15, 1924.

R. E. H. POMEROY 1,481,067

COMBUSTION OF PULVERIZED FUEL

Filed Nov. 19, 1921

5 Sheets-Sheet 2

INVENTOR
Ralph E. H. Pomeroy
by Darwin S. Wolcott
ATTORNEY

Jan. 15, 1924.

R. E. H. POMEROY 1,481,067

COMBUSTION OF PULVERIZED FUEL

Filed Nov. 19, 1921      5 Sheets-Sheet 3

INVENTOR
Ralph E. H. Pomeroy
by Darwin S. Wolcott
ATTORNEY

Jan. 15, 1924.

R. E. H. POMEROY 1,481,067

COMBUSTION OF PULVERIZED FUEL

Filed Nov. 19, 1921

5 Sheets-Sheet 4

INVENTOR

Ralph E. H. Pomeroy
by Darwin S. Scott
ATTORNEY

Jan. 15, 1924.

R. E. H. POMEROY 1,481,067

COMBUSTION OF PULVERIZED FUEL

Filed Nov. 19, 1921

5 Sheets-Sheet 5

INVENTOR

Patented Jan. 15, 1924.

1,481,067

UNITED STATES PATENT OFFICE.

RALPH E. H. POMEROY, OF CANTON, OHIO, ASSIGNOR TO GEORGE J. HAGAN, TRUSTEE, OF PERRYSVILLE, PENNSYLVANIA.

COMBUSTION OF PULVERIZED FUEL.

Application filed November 19, 1921. Serial No. 516,379.

*To all whom it may concern:*

Be it known that I, RALPH E. H. POMEROY, residing at Canton, in the county of Stark and State of Ohio, citizen of the United States, have invented or discovered certain new and useful Improvements in Combustion of Pulverized Fuel, of which improvements the following is a specification.

Two general methods are employed in supplying pulverized fuel to furnaces. According to one method the coal is pulverized, stored in a bin or other receptacle from which it is fed to a furnace, a current of air being generally employed for that purpose. According to the other method, the coal is fed to a pulverizer from which the pulverized coal is drawn by an exhaust fan and by it forced into the furnace. For many reasons the latter method is preferable especially as it avoids the accumulation and storage of such quantities of the pulverized material as will cause destructive explosions if ignited. In the present practice of this second method the air for the removal of the pulverized material and its injection into the furnace is drawn into the pulverizer and passes laden with the fine coal through the fan and thence into the furnace. As will be readily understood by those skilled in the art, the impact and rubbing of the fine particles of coal on the surfaces of the fan are highly injurious to the latter. Injury to the fan also results when the air is highly heated before entering the pulverizer.

A further undesirable feature of this present practice is the necessity of employing a fan for every furnace thus greatly adding to the cost of installation and operation.

The object of the invention described herein consists generally in forcing air through the pulverizer and direct into the furnace. As a result of this method, the fan will not be subjected to the abrading action of the fine particles of coal, nor injurious effect of high temperature. And further, as the cost of handling a given quantity of cold air is substantially less than that of handling the same quantity of highly heated air, the operating cost of the method described and claimed herein will be less than in the present method. As in this new method air can be supplied to a plurality of pulverizers and furnaces from a single fan, the installation of apparatus for carrying out this method will be very much less than that of the apparatus now in use.

The invention is hereinafter more fully described and claimed.

Figure 4:
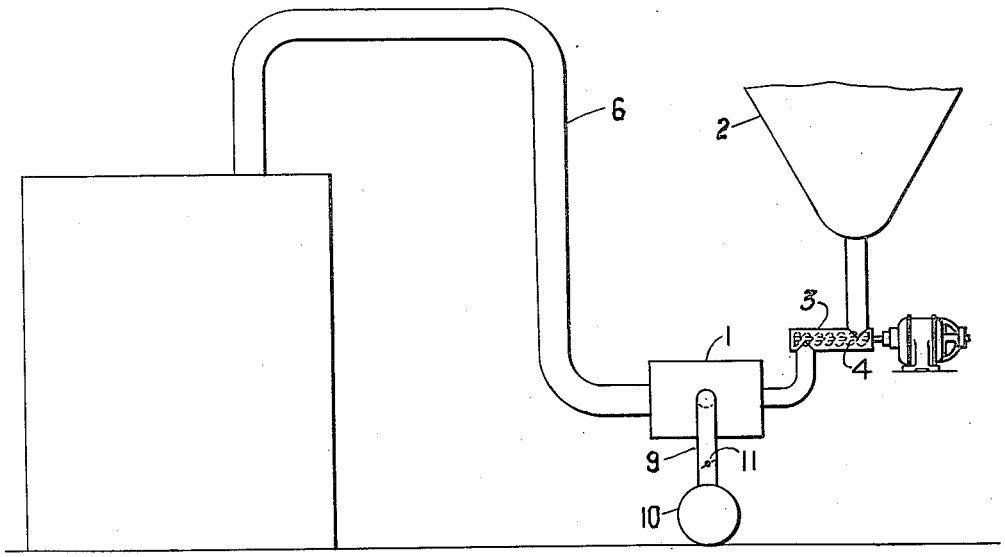

In the accompanying drawings forming a part of this specification Fig. 1 is a top plan view of a boiler installation illustrative of the improvements claimed herein. Fig. 2 is a side elevation of the construction and combination claimed herein, supplying fuel, and air for secondary combustion; Fig. 3 is a view partly in elevation and partly in section illustrating a modification of the manner of introducing air for secondary combustion; Fig. 4 is a view similar to Fig. 3 illustrating a modification of the construction shown in Fig. 3; Figs. 5, 6, 7, 8, 9 and 10 are views similar to Figs. 1 and 2, illustrating certain modifications in the apparatus as will be more fully described hereinafter.

In the practice of the invention the fuel is fed to a pulverizing mechanism 1 of any suitable construction, a suitable means for such feed consisting of a hopper 2, means for regulating the rate of feed, as for example, a conduit 3, a screw conveyor 4, and motor indicated at 5 of any desirable type or construction and connection from the hopper to the regulating means and from the latter to the pulverizer. As will be readily understood by those skilled in the art, the rate of feed of fuel to the pulverizer can be varied by changes in rate of operation of the motor or in any other suitable manner. The discharge opening from the pulverizer is connected by a pipe 6 to a burner or nozzle 7 of any suitable construction which may be arranged to direct the powdered fuel and the carrying of air to any part of the furnace 8, for example, into the lower portions as shown in Fig. 2, or into the upper portion as shown in Figs. 3 and 4.

The pulverizer is so connected as by a pipe 9 to the suitable source of air under pressure, as a fan, that the air in flowing through the pulverizer, pipe 6, and burner 7, will carry with it an amount of pulverized fuel approximately proportional to the quantity of fuel fed into the pulverizer. It will be understood that where an installation includes a plurality of furnaces it would be generally preferable to employ a single source of air under pressure and connect the several pulverizers to a conduit 10 extending from the fan. When a plurality of pulverizers are employed to supply fuel to a corresponding number of furnaces, the feed of fuel to each pulverizer is independently regulated and as the quantity of air forced through a pulverizer should be proportioned to the quantity of fuel to be fed, dampers 11 are arranged in the pipes connecting the air conduit 10 with the pulverizers.

As it is the usual practice to employ, in carrying the pulverized fuel to the furnace, only sufficient air to effect that purpose, and for the initial or partial combustion of the fuel, air for secondary or complete combustion is introduced in the furnace independent of the fuel. This additional air may be introduced adjacent to the point at which the powdered fuel is injected and also at successive points in the direction of the travel of the fuel during combustion as shown in Fig. 3.

In the construction shown in Figs. 1 and 2, a conduit 12 through which air is forced by a fan 13 or other suitable compressor, is connected by pipes 14 to a mixing burner 7 of any suitable construction, said burner being arranged to direct powdered fuel, and air for secondary combustion, into the lower portions of the furnace. If preferred, the fuel may be so injected into the furnace as to move downward during combustion, as shown in Figs. 3 and 4. In case it is desired to supply air for secondary combustion at intervals along the travel of the flame from the point of entrance of the fuel into the furnace, a series of openings 16 are formed in a wall of the furnace and the flow of air through these ports or openings is controlled by dampers 17. The air may flow in at atmospheric pressure as shown in Fig. 4 or if desired, air may be supplied under pressure in which case a pipe 14ª extends from the conduit 12 up along the furnace and is connected by branches to the ports 16 as shown in Fig. 3.

Figure 5:
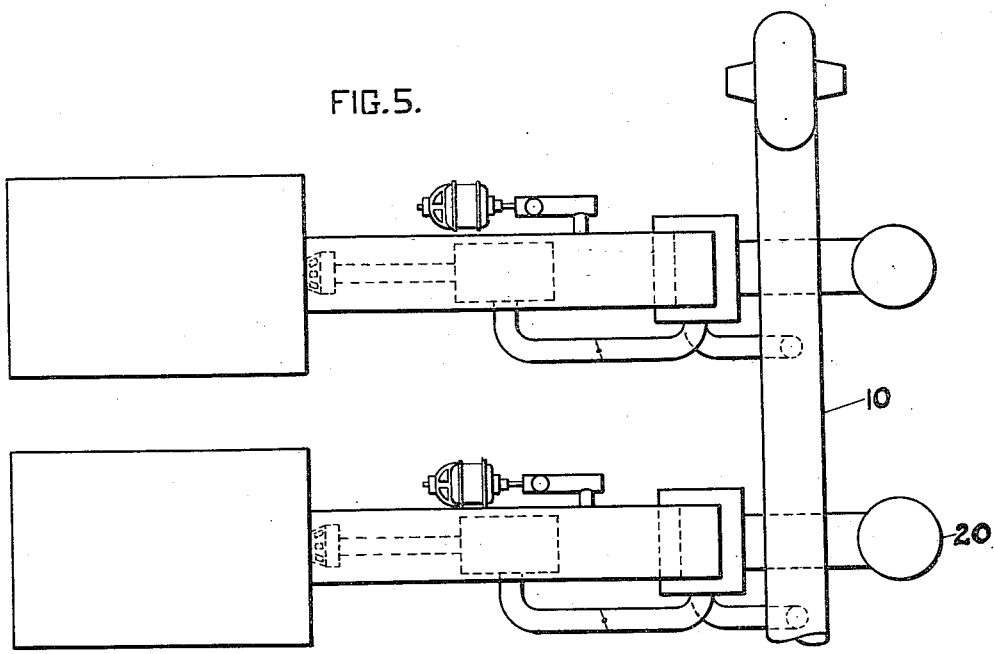
Figure 6:
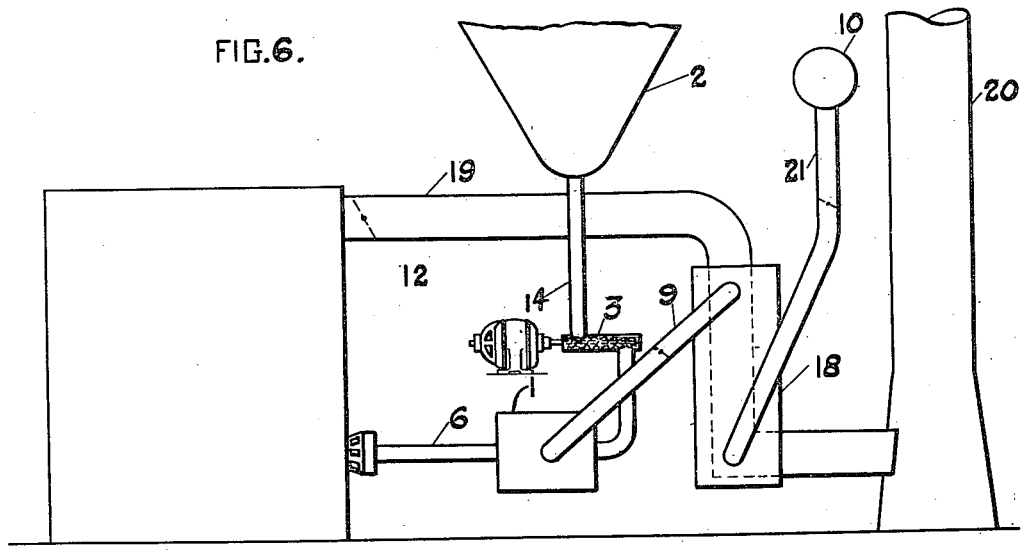

As shown in Figs. 5 and 6 the air for carrying the fuel to the furnace may be heated prior to passing through the pulverizer. To this end a heat exchanger 18 may be arranged in operative relation to a conduit 19 connecting the furnace to the stack 20. The air is conducted from a source of air under pressure as the conduit 10 to the heat exchanger by a pipe 21 and from the heat exchanger to the pulverizer by a pipe 9.

Figure 7:
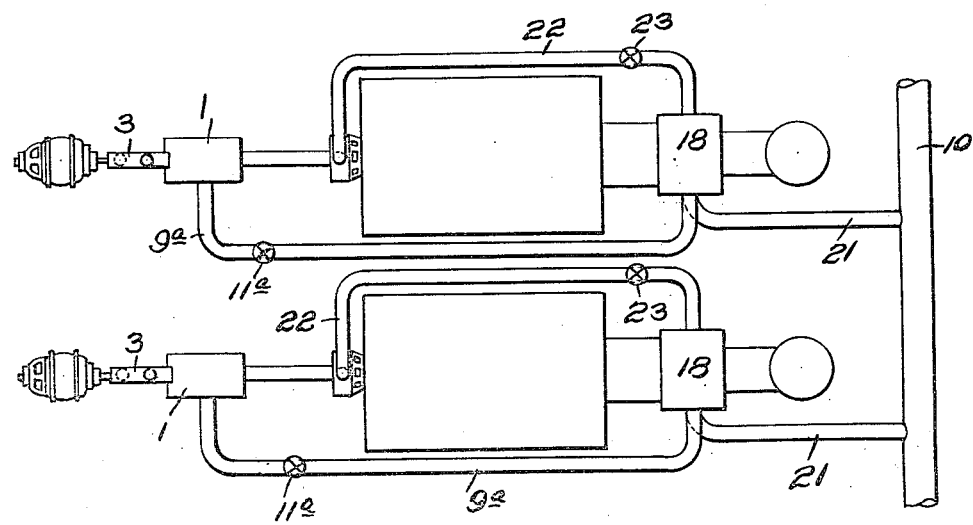
Figure 8:
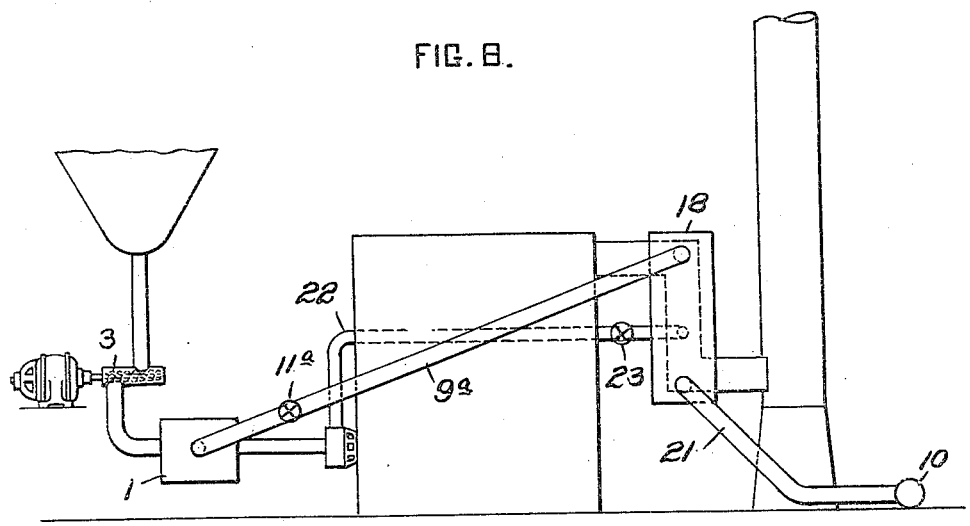

As shown in Figs. 7 and 8, the air for feeding the fuel and that for secondary combustion may be supplied from a common source and both may be heated by the products of combustion flowing from the furnace. To this end the heat exchanger 18 is connected by a pipe 21 to a common source of air under pressure, as for example, the conduit 10, and from the heat exchanger a pipe 9ª extends to the pulverizer and a pipe 22 extends to the furnace. The pipe 9ª is provided with a damper 11ª to regulate the flow of air to the pulverizer and a damper 23 is arranged in the pipe 22 for regulating the flow of secondary air to the furnace.

Figure 9:
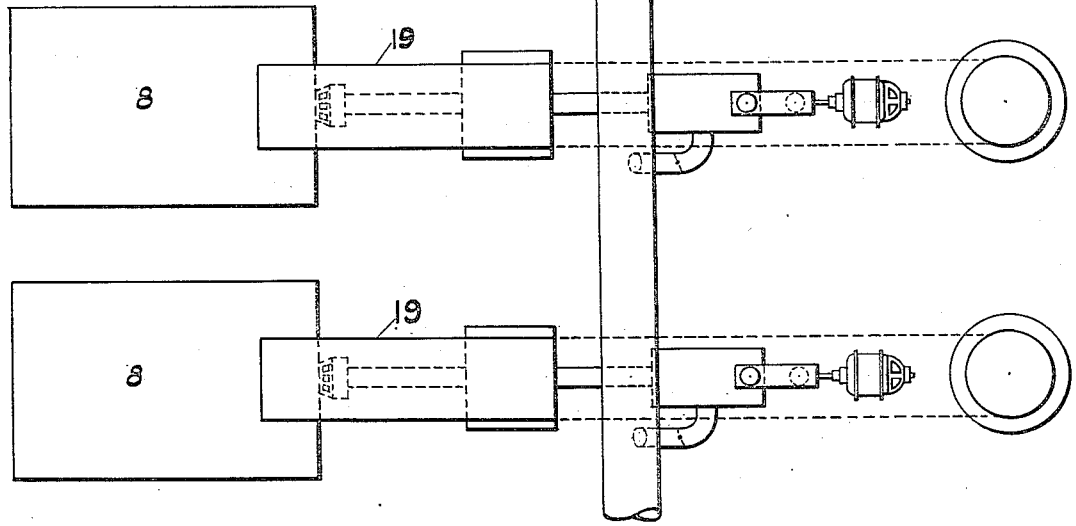
Figure 10:
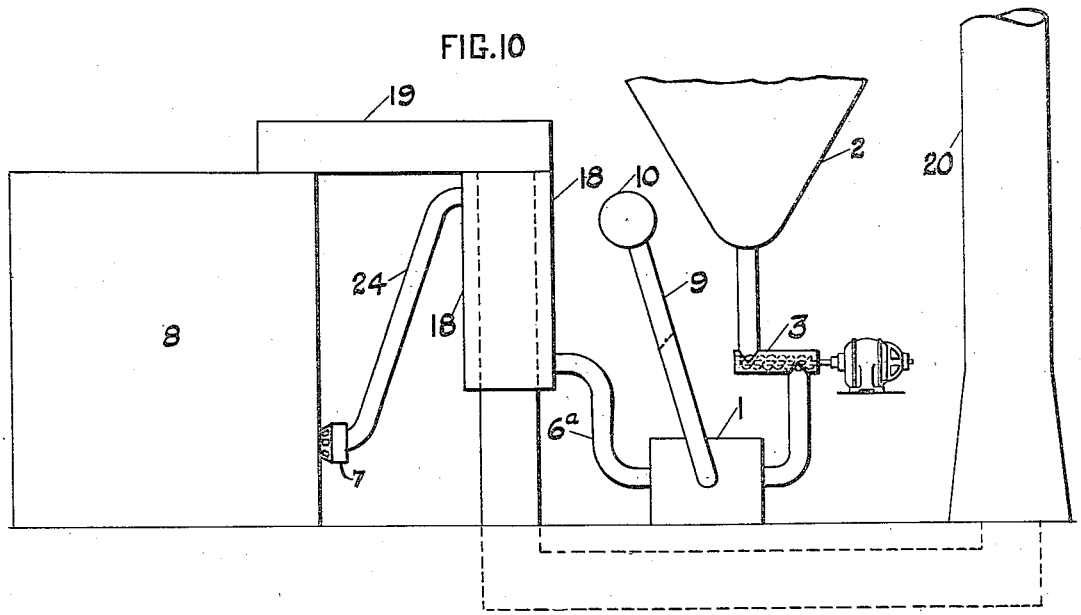

In Figs. 9 and 10 is shown a combination in which provision is made for passing the air and the pulverized fuel carried thereby through a heat exchanger 18. In such case the conduit 10 or other supply of air under pressure is connected by a pipe 9 to the pulverizer and the discharge opening of the pulverizer is connected by a pipe 6ª to the heat exchanger 18 which in turn is connected by a pipe 24 to the furnace.

I claim herein as my invention:

1. The combination of a furnace, a pulverizer connected to the furnace, means for feeding fuel to the pulverizer and means for forcing air under pressure higher than atmospheric pressure into and through the pulverizer and into the furnace.

2. The combination of a plurality of furnaces, a plurality of pulverizers connected to the furnaces, independently regulated means for supplying fuel to the pulverizers and independently regulable means for forcing air at a pressure higher than atmospheric pressure to the pulverizers.

3. The combination of a furnace, a pulverizer connected to the furnace, means for feeding fuel to the pulverizer, means for forcing air under pressure higher than atmospheric pressure into and through the pulverizer and means for heating the air prior to its entrance into the pulverizer.

4. The combination of a furnace, a pulverizer connected to the furnace, a common means for feeding air under pressure higher than atmospheric pressure to the pulverizer and to the furnace, independent means for regulating the flow of air to the pulverizer and the furnace.

In testimony whereof, I have hereunto set my hand.

RALPH E. H. POMEROY.